Figure 1:
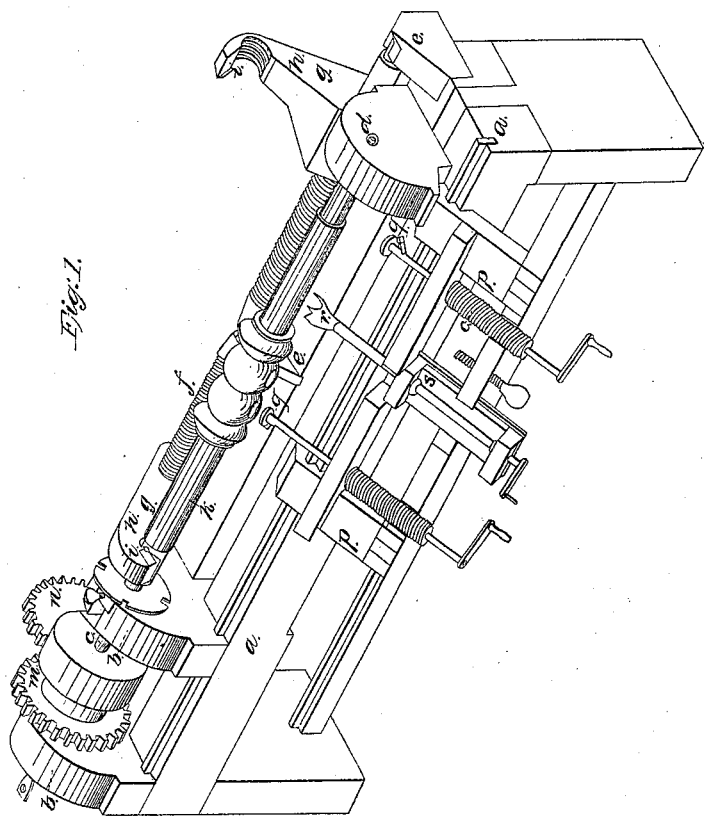

H. P. Nickols,
Making Wooden Screws,
N°. 4,434. Patented Apr. 4, 1846.

UNITED STATES PATENT OFFICE.

HEZEKIAH P. NUCKOLS, OF GLASGOW, KENTUCKY.

MACHINERY FOR CUTTING SCREWS, &c., FOR BEDSTEADS AND CHAIRS.

Specification of Letters Patent No. 4,434, dated April 4, 1846.

*To all whom it may concern:*

Be it known that I, H. P. NUCKOLS, of Glasgow, in the county of Barren and State of Kentucky, have invented a new and useful Improvement in Machinery for Cutting Screws and Taps on Bedsteads and other frames, and that the following is a full, clear, and exact description of the principle or character thereof which distinguishes it from all other things before known and of the manner of making, constructing, and using the same, reference being had to the accompanying drawing, making part of this specification, which is an isometrical projection of the machine.

The nature of my improvement consists in an apparatus for cutting right and left hand screws on bedsteads, and other frame work and its construction is as follows: An oblong frame ($a$) supported on legs similar to a common lathe but broader is made to contain the machinery; on this are erected puppet heads ($b$) in which are placed a mandrel ($c$) and center screw ($d$), as in the common lathe; the rail for a bedstead, properly turned, is fixed in this (or the machine itself may be used to turn it in). Behind the line of the puppet heads ($b$) are three standards ($e$) one at each end and one at the center; in these standards are the bearings of a screw ($f$) parallel with and a little below the line of the mandrel, the threads of which are cut from the two ends toward the center in opposite directions so as to form a right and left screw of it; on each end of this screw ($f$) are put nuts ($g$) so that when the screw is turned one way they will be made to run toward the center, and vice versa. From the nuts ($g$) project arms ($h$) that extend up over the article ($k$) on which the screw is to be cut, they have a semi-circular groove cut in their underside near the end that fits onto ($k$) and is chased out with screw threads; on the inner side of this groove toward the center there is a V cutter ($i$) of the usual form, for cutting screws. The screw ($f$) is turned by means of a spur wheel ($m$) on the mandrel that works into another ($n$) on the screw, and their relative size determines the comparative velocity at which the cutter arm ($h$) is made to advance and the apparatus is so arranged that at the termination of this operation the piece is in a proper position to be tapped by the tap ($q$) on the sliding carriage ($p$) about to be described. On the frame ($a$) in front of the puppet heads there is a rail ($o$) parallel with the work and on the lower bar of the frame is another; on these slides a carriage ($p$) from end to end of the machine. This carriage supports two screw taps ($q$, $q$,) one of which is a right hand one, and the other a left hand one; they are so located as to point toward the center of revolution of the work in the lathe and at a proper angle for cutting the screw and as they are turned they are forced forward or back by a screw cut on their shanks. Between these taps on the same carriage is placed a center bit ($r$), parallel with them in a frame ($s$) that can slide in the carriage up toward, or be drawn back from the work. To use this part of the apparatus, the carriage is moved to the proper place, and the bit ($r$) is slid up against the work and a hole bored therein, after which the carriage is moved to the right or left as the case may require, and the right or left hand tap is brought opposite the hole and a female screw thread cut therein. From the above description it will be obvious that the tools can all, or either of them, at any time be removed from the work. By this apparatus the frame of a bedstead chair &c., can be perfected without removing it from the lathe.

Having thus fully described my improvement, what I claim therein as new and desire to secure by Letters Patent is—

. The combination of the right and left hand screw cutters with the frame for tapping and boring substantially in the manner set forth, so that they can be brought into action or removed at any required time, as described and designate the proper angle for the frame.

H. P. NUCKOLS.

Witnesses:
POUNCY NUCKOLS,
B. B. CRUMP.